US008595194B2

(12) United States Patent
Cormode et al.

(10) Patent No.: US 8,595,194 B2
(45) Date of Patent: Nov. 26, 2013

(54) FORWARD DECAY TEMPORAL DATA ANALYSIS

(75) Inventors: Graham Cormode, Morristown, NJ (US); Vladislav Shkapenyuk, Brooklyn, NY (US); Divesh Srivastava, Summit, NJ (US); Bojian Xu, Ames, IA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 519 days.

(21) Appl. No.: 12/560,214

(22) Filed: Sep. 15, 2009

(65) Prior Publication Data

US 2011/0066600 A1 Mar. 17, 2011

(51) Int. Cl.
*G06F 17/30* (2006.01)

(52) U.S. Cl.
USPC .......................................................... 707/689

(58) Field of Classification Search
USPC .......................................................... 707/689
See application file for complete search history.

(56) References Cited

U.S. PATENT DOCUMENTS

| | | | |
|---|---|---|---|
| 5,600,831 A | | 2/1997 | Levy et al. |
| 5,655,116 A | | 8/1997 | Kirk et al. |
| 5,717,869 A | * | 2/1998 | Moran et al. .................. 715/716 |
| 5,717,879 A | * | 2/1998 | Moran et al. .................. 715/716 |
| 5,786,814 A | * | 7/1998 | Moran et al. .................. 715/720 |
| 5,788,123 A | * | 8/1998 | Hackmann et al. ...... 222/153.13 |
| 5,897,632 A | | 4/1999 | Dar et al. |
| 5,956,722 A | | 9/1999 | Jacobson et al. |
| 5,970,489 A | | 10/1999 | Jacobson et al. |
| 5,987,467 A | | 11/1999 | Ross et al. |
| 5,999,192 A | | 12/1999 | Selfridge et al. |
| 6,026,390 A | | 2/2000 | Ross et al. |
| 6,032,144 A | | 2/2000 | Srivastava et al. |
| 6,047,272 A | | 4/2000 | Biliris et al. |
| 6,061,676 A | | 5/2000 | Srivastava et al. |
| 6,070,157 A | | 5/2000 | Jacobson et al. |
| 6,073,130 A | | 6/2000 | Jacobson et al. |
| 6,134,553 A | | 10/2000 | Jacobson et al. |
| 6,160,971 A | | 12/2000 | Scheuer et al. |
| 6,167,397 A | | 12/2000 | Jacobson et al. |
| 6,212,552 B1 | | 4/2001 | Biliris et al. |
| 6,332,147 B1 | * | 12/2001 | Moran et al. .................. 715/203 |
| 6,338,058 B1 | | 1/2002 | Jacobson et al. |
| 6,363,379 B1 | | 3/2002 | Jacobson et al. |
| 6,401,088 B1 | | 6/2002 | Jagadish et al. |
| 6,434,573 B1 | | 8/2002 | Jacobson et al. |

(Continued)

OTHER PUBLICATIONS

Linking Temporal Records, Li et al., 2011.*

(Continued)

*Primary Examiner* — Jean M Corrielus
(74) *Attorney, Agent, or Firm* — Scott P. Zimmerman, PLLC

(57) ABSTRACT

A disclosed method for implementing time decay in the analysis of streaming data objects is based on the age, referred to herein as the forward age, of a data object measured from a landmark time in the past to a time associated with the occurrence of the data object, e.g., an object's timestamp. A forward time decay function is parameterized on the forward age. Because a data object's forward age does not depend on the current time, a value of the forward time decay function is determined just once for each data object. A scaling factor or weight associated with a data object may be weighted according to its decay function value. Forward time decay functions are beneficial in determining decayed aggregates, including decayed counts, sums, and averages, decayed minimums and maximums, and for drawing decay-influenced samples.

13 Claims, 6 Drawing Sheets

(56) References Cited

U.S. PATENT DOCUMENTS

| | | |
|---|---|---|
| 6,438,608 B2 | 8/2002 | Biliris et al. |
| 6,442,546 B1 | 8/2002 | Biliris et al. |
| 6,606,639 B2 | 8/2003 | Jacobson et al. |
| 6,904,433 B2 | 6/2005 | Kapitskaia et al. |
| 6,980,985 B1 | 12/2005 | Amer-Yahia et al. |
| 7,010,522 B1 | 3/2006 | Jagadish et al. |
| 7,143,241 B2 | 11/2006 | Hull |
| 7,162,169 B1 | 1/2007 | Lestrange |
| 7,165,100 B2 | 1/2007 | Cranor et al. |
| 7,185,012 B1 | 2/2007 | Koudas et al. |
| 7,219,091 B1 | 5/2007 | Bruno et al. |
| 7,227,803 B2 | 6/2007 | Lee et al. |
| 7,346,839 B2 | 3/2008 | Acharya et al. |
| 7,356,528 B1 | 4/2008 | Amer-Yahia et al. |
| 7,415,461 B1 | 8/2008 | Guha et al. |
| 7,440,957 B1 | 10/2008 | Kotidis et al. |
| 7,444,326 B1 | 10/2008 | Jagadish et al. |
| 7,450,032 B1 | 11/2008 | Cormode et al. |
| 7,451,144 B1 | 11/2008 | Koudas et al. |
| 7,451,214 B1 | 11/2008 | Cranor et al. |
| 7,454,415 B1 | 11/2008 | Bruno et al. |
| 7,483,887 B1 | 1/2009 | Bruno et al. |
| 7,523,091 B2 | 4/2009 | Kapitskaia et al. |
| 7,536,396 B2 | 5/2009 | Johnson et al. |
| 7,584,396 B1 | 9/2009 | Cormode et al. |
| 7,590,657 B1 | 9/2009 | Cormode et al. |
| 7,623,534 B1 | 11/2009 | Ramakrishnan et al. |
| 7,630,967 B1 | 12/2009 | Srivastava et al. |
| 7,631,074 B1 | 12/2009 | Srivastava et al. |
| 7,639,714 B2 | 12/2009 | Stolfo et al. |
| 7,657,503 B1 | 2/2010 | Cormode et al. |
| 7,664,749 B1 | 2/2010 | Koudas et al. |
| 7,664,806 B1 | 2/2010 | Koudas et al. |
| 7,668,801 B1 | 2/2010 | Koudas et al. |
| 7,672,920 B2 * | 3/2010 | Ito et al. ............... 706/30 |
| 7,742,424 B2 | 6/2010 | Cormode et al. |
| 7,756,805 B2 | 7/2010 | Cormode et al. |
| 7,783,647 B2 | 8/2010 | Cormode et al. |
| 7,831,711 B2 | 11/2010 | Cranor et al. |
| 7,849,091 B1 | 12/2010 | Cho et al. |
| 7,864,077 B2 | 1/2011 | Cormode et al. |
| 7,885,911 B2 | 2/2011 | Cormode et al. |
| 7,904,444 B1 | 3/2011 | Koudas et al. |
| 7,904,458 B2 | 3/2011 | Koudas et al. |
| 7,921,100 B2 | 4/2011 | Hadjieleftheriou et al. |
| 7,949,581 B2 | 5/2011 | Barney |
| 7,979,443 B2 | 7/2011 | Cho et al. |
| 2001/0009017 A1 | 7/2001 | Biliris et al. |
| 2002/0002562 A1 * | 1/2002 | Moran et al. ............... 707/500 |
| 2002/0042673 A1 * | 4/2002 | Ooga ............... 701/120 |
| 2002/0059380 A1 | 5/2002 | Biliris et al. |
| 2002/0138467 A1 | 9/2002 | Jacobson et al. |
| 2003/0055950 A1 | 3/2003 | Cranor et al. |
| 2003/0097355 A1 | 5/2003 | Kapitskaia et al. |
| 2004/0030832 A1 | 2/2004 | Squibbs |
| 2004/0226015 A1 | 11/2004 | Leonard et al. |
| 2005/0026631 A1 | 2/2005 | Hull |
| 2005/0027717 A1 | 2/2005 | Koudas et al. |
| 2005/0071741 A1 | 3/2005 | Acharya et al. |
| 2005/0131946 A1 | 6/2005 | Korn et al. |
| 2005/0203897 A1 | 9/2005 | Kapitskaia et al. |
| 2006/0053122 A1 | 3/2006 | Korn et al. |
| 2006/0112090 A1 | 5/2006 | Amer-Yahia et al. |
| 2006/0224609 A1 | 10/2006 | Cormode et al. |
| 2007/0094297 A1 | 4/2007 | Barney |
| 2007/0136285 A1 | 6/2007 | Cormode et al. |
| 2007/0226239 A1 | 9/2007 | Johnson et al. |
| 2007/0237410 A1 | 10/2007 | Cormode et al. |
| 2007/0240061 A1 | 10/2007 | Cormode et al. |
| 2007/0286071 A1 | 12/2007 | Cormode et al. |
| 2008/0052268 A1 | 2/2008 | Koudas et al. |
| 2008/0140619 A1 | 6/2008 | Srivastava et al. |
| 2008/0154891 A1 | 6/2008 | Amer-Yahia et al. |
| 2008/0270071 A1 * | 10/2008 | Marvasti et al. ............... 702/179 |
| 2009/0052448 A1 | 2/2009 | Ramakrishnan et al. |
| 2009/0052449 A1 | 2/2009 | Ramakrishnan et al. |
| 2009/0063681 A1 | 3/2009 | Ramakrishnan et al. |
| 2009/0083418 A1 | 3/2009 | Krishnamurthy et al. |
| 2009/0106417 A1 | 4/2009 | Cranor et al. |
| 2009/0132561 A1 | 5/2009 | Cormode et al. |
| 2009/0138469 A1 | 5/2009 | Koudas et al. |
| 2009/0138470 A1 | 5/2009 | Koudas et al. |
| 2009/0150339 A1 | 6/2009 | Bruno et al. |
| 2009/0153379 A1 | 6/2009 | Cormode et al. |
| 2009/0171944 A1 | 7/2009 | Hadjieleftheriou et al. |
| 2009/0172058 A1 | 7/2009 | Cormode et al. |
| 2009/0172059 A1 | 7/2009 | Cormode et al. |
| 2009/0187584 A1 | 7/2009 | Johnson et al. |
| 2009/0287721 A1 | 11/2009 | Golab et al. |
| 2009/0292726 A1 | 11/2009 | Cormode et al. |
| 2010/0023512 A1 | 1/2010 | Ramakrishnan et al. |
| 2010/0030741 A1 | 2/2010 | Johnson et al. |
| 2010/0030809 A1 | 2/2010 | Nath |
| 2010/0042581 A1 | 2/2010 | Srivastava et al. |
| 2010/0042606 A1 | 2/2010 | Srivastava et al. |
| 2010/0058405 A1 | 3/2010 | Ramakrishnan et al. |
| 2010/0100538 A1 | 4/2010 | Koudas et al. |
| 2010/0100552 A1 | 4/2010 | Koudas et al. |
| 2010/0100553 A1 | 4/2010 | Koudas et al. |
| 2010/0114840 A1 | 5/2010 | Srivastava et al. |
| 2010/0114920 A1 | 5/2010 | Srivastava et al. |
| 2010/0114989 A1 | 5/2010 | Cormode et al. |
| 2010/0125559 A1 | 5/2010 | Hadjieleftheriou et al. |
| 2010/0132036 A1 | 5/2010 | Hadjieleftheriou et al. |
| 2010/0138443 A1 | 6/2010 | Ramakrishnan et al. |
| 2010/0153064 A1 | 6/2010 | Cormode et al. |
| 2010/0153328 A1 | 6/2010 | Cormode et al. |
| 2010/0153379 A1 | 6/2010 | Cormode et al. |
| 2010/0235362 A1 | 9/2010 | Cormode et al. |
| 2010/0268719 A1 | 10/2010 | Cormode et al. |
| 2010/0274785 A1 | 10/2010 | Procopiuc et al. |
| 2010/0293129 A1 | 11/2010 | Dong et al. |
| 2010/0312872 A1 | 12/2010 | Cormode et al. |
| 2010/0318438 A1 | 12/2010 | Cormode et al. |
| 2010/0318519 A1 | 12/2010 | Hadjieleftheriou et al. |
| 2011/0041184 A1 | 2/2011 | Cormode et al. |
| 2011/0047185 A1 | 2/2011 | Cho et al. |
| 2011/0060818 A1 | 3/2011 | Cranor et al. |
| 2011/0131170 A1 | 6/2011 | Golab et al. |
| 2011/0138264 A1 | 6/2011 | Cormode et al. |
| 2011/0145223 A1 | 6/2011 | Cormode et al. |

OTHER PUBLICATIONS

Forward Decay: A Practical Time Decay Model for Streaming Systems, Cormode et al., 2011.*

A Java Data Analysis System for Total Data Readout, P. Rahkila, 2008.*

Cranor, Charles D., Johnson, Theodore, Spatscheck, Oliver, Gigascope: A Stream Database for Network Application, Proceedings of the 2003 ACM SIGMOD International Conference on Management of Data, Jun. 9-12, 2003, pp. 647-651.

Cormode, Graham, Shkapenyuk, Vladislav, Srivastava, Divesh, Bojian, Xu, Forward Decay: A Practical Time Decay Model for Streaming Systems, ICDE, 2009 IEEE International Conference on Data Engineering, Mar. 29-Apr. 2, 2009, pp. 138-149.

* cited by examiner

FORWARD DECAY TEMPORAL DATA ANALYSIS

BACKGROUND

1. Field of the Disclosure

The present disclosure relates to data analysis and, specifically, to temporal data analysis.

2. Description of the Related Art

Temporal data analysis in data warehouses and data streaming systems may implement time decay methods to evaluate the relative temporal importance of data objects. Time decay operations based on time measurements from the current time backward may not be scalable for generalized implementation in business systems.

DESCRIPTION OF THE EXEMPLARY EMBODIMENTS

Figure 1A:
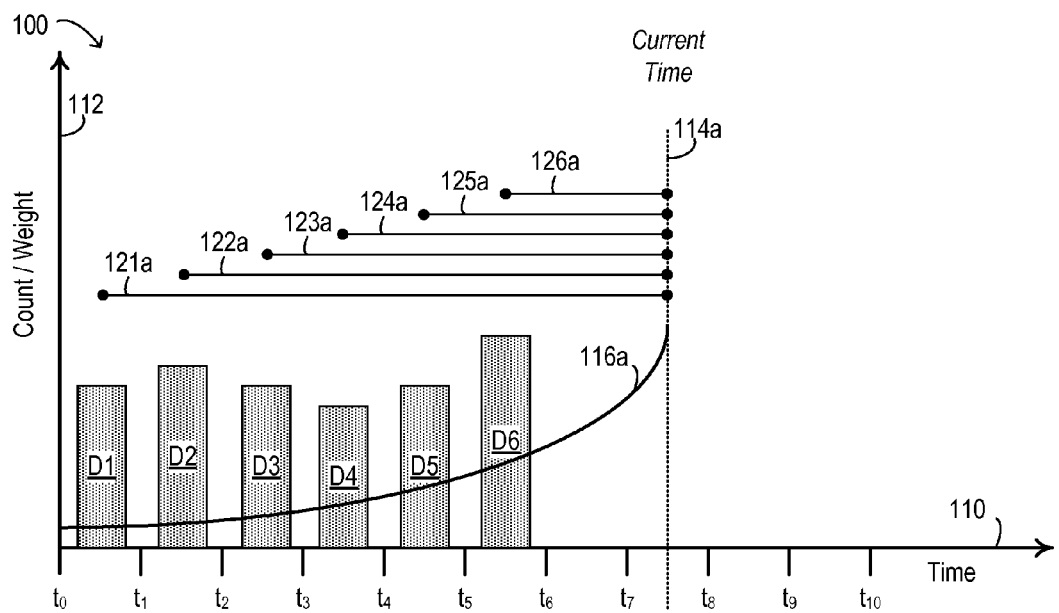
FIGS. 1A and 1B are diagrams illustrating selected elements of an embodiment of a backward time decay temporal data analysis.

In one aspect, a disclosed method for calculating time decay associated with data objects arriving at a data management system includes determining a forward age associated with a data object based on a difference between an arrival time of the data object at the data management system and a landmark time prior to the arrival time, and recording the forward age in a memory media. The method may also include weighting a parameter value associated with the data object with a decay function based on the current time and the forward age, wherein the forward age associated with the data object does not change as time elapses.

In some instances, the data object may arrive at the data management system in response to a query issued by the data management system. The method may further include storing the data object to the memory media upon arrival.

In some embodiments, the method further includes calculating an age factor associated with the data object based on said weighting, and ranking the data object relative to other data objects based on the age factor. The data management system may be a transactional data stream management system, while the method may further include determining whether to transmit the data object based on the age factor. Responsive to determining to transmit the data object, an indication of the age factor may be transmitted along with the data object. The decay function may be an exponential function, a polynomial function, a landmark window function, or a combination thereof.

In another aspect, a disclosed computer system for calculating time decay associated with arriving data objects includes a processor, and memory media accessible to the processor, including processor executable instructions. Upon arrival of a data object, the instructions may be executable to determine a forward age associated with the data object based on a difference between an arrival time of the data object and a landmark time prior to the arrival time. The instructions may further be executable to weight a parameter value associated with the data object based on the forward age and a value of a decay function, wherein the forward age associated with the data object is a constant. The decay function value may depend on the current time.

In some embodiments, the computer system further includes processor executable instructions to calculate a decayed count for a plurality of arriving data objects, such that the decayed count may be a sum of the decay function value over the arriving data objects. A decayed sum for a plurality of arriving data objects may also be calculated, such that the decayed sum may be a sum of the weighted value over the arriving data objects. A decayed average for the plurality of arriving data objects may be calculated, such that the decayed average is a ratio of the decayed sum to the decayed count.

In some cases, the computer system still further includes processor executable instructions to determine which of a plurality of data objects has the highest weighted value, and determine which of the plurality of data objects has the lowest weighted value. The computer system may be configured to receive arriving data objects from at least one access router in parallel with network equipment to which the arriving data objects are addressed. The computer system may be configured to receive arriving data objects from at least one access router and transmit the arriving data objects to network equipment to which the arriving data objects are addressed.

In yet another aspect, disclosed computer-readable memory media may include processor instructions for applying a time decay function to a plurality of arriving data objects. Upon arrival of a data object, the instructions may be executable to determine a forward age associated with the data object based on a difference between an arrival time of the data object and a landmark time prior to the arrival time, and associate a weighted value with the data object, wherein the weighted value depends on a decay function and the forward age, wherein the forward age associated with the data object is a constant.

In some instances, the instructions are executable to store the forward age to a memory media. The instructions may further be executable to calculate the decay function based on the current time. The instructions may still further be executable to apply the weighted value to a parameter value associated with the data object.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Data management systems, such as data warehouses and data streaming systems, are generally referred to herein as instances of "databases". As used herein, a "table" refers to an orthogonal data structure in a database having rows and columns of individual data elements. The "columns" of a table generally define different data fields, which may be of specified data types, such as integer, numeric, text, enumerated lists, etc. The "rows" in a table refer to a data entry including one element for each column in the table. An individual row in a table is also referred to as a "record" or "tuple." A "data object" may refer to an element of information processed by a database, such as a file, a binary object, a tuple, a message, or a combination thereof.

Temporal data analysis in data management systems, such as data warehouses and data streaming systems, may implement the concept of time decay to reflect the reality that, in many applications, older data is less meaningful than newer data. Time decay is generally achieved by employing a decay function. Examples of the most commonly encountered decay functions include sliding window decay functions, exponential decay functions, and polynomial decay functions.

A decay function assigns a decay factor or weight to the $i^{th}$ item or data object in a data stream based on a characteristic or property of the data object including, as an example, a timestamp or other indication of the timing or occurrence of the $i^{th}$ data object (denoted as $t_i$). The assigned weight may also depend on other factors including, as an example, the current time t. A function w(i,t) is defined for purposes of this disclosure as a decay function if it exhibits the following two properties:

$w(i,t)=1$ when $t_i=t$ and $0 \le w(i,t) \le 1$ for all $t \ge t_i$.   Property 1:

w is monotone and non-increasing with respect to t:
$t' \ge t \Rightarrow w(i,t') \le w(i,t)$.   Property 2:

Property 1 states that the newest data object is assigned a weight of 1 and all data objects older than the newest data object are assigned a weight that is between 0 and 1. Property 2 states that the weight assigned to a given data object is greater than or equal to the weight assigned to all data objects older than the given data object.

Historically, decay functions have commonly been implemented from a perspective referred to herein as "backwards." Qualitatively, backward time decay refers to a decay function in which the weight assigned to a data object is based on the age of the data object, i.e., backward time decay is determined from the perspective of the current time by looking back in time to see how long ago a data object occurred.

More formally, a function w(i,t) may be defined as a backward time decay function if w is a positive monotone non-increasing function and the weight of the $i^{th}$ data object, evaluated at time t, is given by Equation 1.

$$w(i,t) = \frac{f(t-t_i)}{f(t-t)} = \frac{f(t-t_i)}{f(0)}$$   {Equation 1}

Equation 1 suggests a computational complexity associated with backward time decay functions. Specifically, while the denominator, ƒ(0), is a constant, the numerator, ƒ(t–$t_i$), is a function of two parameters i and t. For the case of a generalized function w and a set of n data objects, computation of the decay function values requires the computation of n values of the function ƒ. If n is large and the amount of time between successive instances of t is small, the computational demands imposed by a backward time decay can burden the computational system. This problem is only further exacerbated if the function ƒ is, itself, computationally complex.

One fundamental problem addressed by the methods described herein is how to support time decay while satisfying a wide variety of queries in a large class of data management systems. It is noted that time decay analysis may be applied across a broad class of systems, such as data warehouses, data streaming systems, sensor networks, and other distributed monitoring systems. Although the examples presented herein show systems for managing data streams, the methods described herein are readily amenable to a variety of database management applications.

Building robust systems for managing data streams may be a challenging task, since typical streams (in application areas such as networks and financial data) arrive at very high rates and are subject to immediate processing. Queries may be continuous, meaning that the output of a query is itself a stream, which may be the input for subsequent querying. Systems may also cope with data quality issues: for example, there may be no guarantee that data objects will arrive in timestamp order. One example of a data stream management system is the GS Tool, formerly referred to as Gigascope, which is a network stream processing system developed at AT&T that allows a wide variety of queries to be posed in a Structured Query Language (SQL)-like language, and which is extensible.

This infrastructure has enabled approximate algorithms to be evaluated in the non-decayed case. Approaches based on backward age for handling time decay may not scale well within streaming systems. For example, answering queries with a sliding window may involve buffering large quantities of data objects when using backward age. The resources needed may be of the order of megabytes of space per group and milliseconds of time per data object to track complex holistic aggregates. However, real-time applications may only afford a few kilobytes of space per group in a query (since there can be tens of thousands of active groups) and microseconds per update. Thus, backward age based time decay may not be suitable for deployment in high throughput systems.

Specifically, in a backward time decay analysis, the weight of a data object is computed based on its age, measuring back from the current time. This definition is based on physical analogies: backward time decay based on an exponential function resembles radioactive decay; and with a polynomial function, backward time decay resembles the dispersion of energy, such as acoustic waves. Implementing backward age time decay may be problematic, since a data object's backward age continuously changes as time elapses, which may lead to the buffering of additional data associated with recomputing relative weights for a query.

As will be described in detail below, a new class of "forward" time decay may be based on measuring a forward age for a data object, from a fixed point in time forward to an arrival time for the data object. An approach to time decay based on forward age, or simply "forward time decay", may be compatible with practical models, such as exponential decay and landmark windows, but may also include a wide class of other types of time decay analyses. Forward time decay may be implemented using computationally efficient algorithms to compute a variety of aggregates and draw samples under forward time decay, while remaining relatively simple to implement scalably.

Like backward time decay, forward time decay satisfies Property 1 and Property 2 described above. In contrast to backward time decay, however, forward time decay for a given data object is determined based on the amount of time elapsing between a fixed point in time L, known as the landmark time, and the occurrence of the given data object. By convention, the landmark time L is generally selected to be earlier than the timestamps of all of the data objects. Thus, forward time decay may be said to look forward in time from the landmark time L to see when a data object occurred, in contrast to looking backward from the current time as is true in the case of backward time decay.

Because Property 2 of a decay function requires heavier weighting of more recent data objects than older data objects, a forward time decay function g is a monotone non-decreasing function. In order to satisfy Property 1 of a decay function, the values of g are normalized to the value of g associated with the current time t. More formally, given a positive monotone non-decreasing function g, and a landmark time L, the decayed weight of an item with arrival time measured at time t is given by:

$$w(i, t) = \frac{g(t_i - L)}{g(t - L)} \quad \{\text{Equation 2}\}$$

Equation 2 suggests some computationally desirable characteristics of forward time decay functions. The numerator is a function of i, but not t. The denominator is a function of t, but not i. Qualitatively, this means that, for a generalized function w and a set of i data objects at a given time $t_i$, the computation of the decay function values requires i+1 computations of the function g, including i computations for the numerator (one computation for each of the i data objects and one computation for the denominator. More significantly, however, computation of the decay function values for the next successive value of t ($t_{i+1}$) requires only two computations of the function g, one computation for the i+1$^{th}$ data object and one computation for the denominator. While it is true that the denominator must be calculated for each new value of t and that the resulting denominator must be used as the divisor to determine the decay factors for all data objects, this approach to implementing time decay will generally require less computational resources and time than would be required to calculate the value of the decay function g at time t for each data object.

It is noted that forward time decay may exhibit numerous advantageous properties, including, but not limited to:

a. Exponential decay functions exhibit the property that decay function values for forward decay and backward decay models are the same, but the decay function values are, in the most general case, easier to compute for forward time decay. Forward time decay may also permit the implementation of effective algorithms for sampling under exponential decay.

b. For a large class of functions, in particular monomial functions, forward time decay may provide a useful relative decay property, namely, that the decay function weight of a data object is solely dependent on the relative age of the data object, i.e., how far, as a percentage, the data object falls along the interval between a landmark time and the current time. So, for example, given a polynomial decay function, the decay function weight for the 50% data object, i.e., the data object occurring half way between the landmark time L and the current time t does not vary. This is a potentially beneficial property that backward time decay models may not exhibit.

c. Forward time decay may accommodate and permit generalization of the concept of landmark windows using a landmark window decay function (g(n)=1 for n>0, g(n)=0 otherwise).

Forward time decay, as described herein, provides a novel, scalable technique to implement time-decayed query answering in a wide range of data management systems, and may be easily integrated into an existing system. In particular embodiments, implementing forward time decay may involve few or no changes to existing system architectures and/or query languages. In certain embodiments, forward time decay may be implemented in a data management system with little or no overhead compared to undecayed computations. Exemplary implementations may be implemented without extensions to a query language of the data management system and may represent a practical approach of time decay for systems that deal with time-based data.

As discussed, a decay function, whether based on a forward or backward perspective, assigns a weight to each data object in the input. Except for the case of a no decay function, the weighting assigned to a data object varies with time. The application of forward time decay concepts to streaming systems is discussed in G. Cormode, V. Shkapenyuk, D. Srivastava, B. Xu, *Forward Decay: A Practical Time Decay Model for Streaming Systems*, in Proceedings of the 2009 IEEE International Conference on Data Engineering, which is incorporated by reference herein.

Computations of decayed aggregate values use the decay weighting to scale the contribution of each data object to the aggregate. To illustrate the utility that is a characteristic of the forward time decay model, the computation of various exact and/or approximate aggregates over n tuples using forward time decay based on a function g and a landmark time L is described. Count, Sum and Average are examples of aggregates that are relatively straightforward to generalize under forward time decay. Although these aggregates are disclosed expressly herein, the computation of aggregates using forward time decay is not limited to the expressly discussed examples.

Forward time decay may be employed to calculate a forward time decayed count, C, where the C is the sum of the decayed values, i.e., the weights, of a set of stream data objects as indicated in Equation 3.

$$C = \sum_{i=1}^{n} (g(t_i - L)/g(t - L)) \quad \{\text{Equation 3}\}$$

Similarly, a forward time decayed sum, S, may be calculated where S incorporates an additional value $v_i$ for each data object i and sums the weighted values as indicated in Equation 4.

$$S = \sum_{i=1}^{n} (g(t_i - L)v_i/g(t - L)) \quad \{\text{Equation 4}\}$$

A forward time decayed average value, A, may be calculated by dividing S from Equation 4 by C from Equation 3 as indicated in Equation 5.

$$A = S/C = \left(\sum_i g(t_i - L)v_i\right) \bigg/ \left(\sum_i g(t_i - L)\right) \quad \{\text{Equation 5}\}$$

It is noted that Equation 4 may be rewritten as shown in Equation 6, which suggests that the forward time decayed sum S can be computed by maintaining the value of $$\sum_i g(t_i - L)v_i,$$

and scaling by the value of g(t−L) only when needed for output. The forward time decayed count C can be maintained in the same fashion, and the forward time decayed average value A is given by the ratio of these two values.

$$S = \frac{1}{g(t-L)}\left(\sum_i g(t_i - L)v_i\right) \quad \{\text{Equation 6}\}$$

Other numeric quantities can be computed similarly. For example, a forward time decayed variance V (interpreting weights as probabilities) can be written in terms of the decayed sum of squared values as indicated in Equation 7.

$$V = \sum_i g(t_i - L)v_i^2/C - A^2. \quad \{\text{Equation 7}\}$$

More generally, a forward time decayed summation of an algebraic expression of tuple values, i.e., an expression based on standard arithmetic operations such as addition, multiplication and exponentiation, may be found by computing the value of the expression on tuple $t_i$ and multiplying by $g(t_i-L)$. The final result is found by scaling the sum by $g(t-L)$ at query time t. Thus, a summation of an arithmetic operation on tuples that can be computed in constant space without decay can also be computed in constant space under a forward decay function. Algebraic quantities can be computed under any forward decay function using existing arithmetic support. This can be specified directly in the query by spelling out the function to create the weights, or by adding some simple syntactic additions to achieve the same effect. For example, within the Gigascope query language (GSQL), we can express a decayed count query under quadratic decay as:

```
select tb, destIP, destPort,
  sum(len*(time % 60)*(time % 60))/3600 from TCP
  group by time/60 as tb, destIP, destPort
```

Here, the query finds the (decayed) sum of lengths of packets per unique destination (port, address) pair, within a window constrained to 60 seconds (hence the scaling by 3600). Since it is expressed entirely in the high-level query language, the optimizer can decide how to execute it, find shared subexpressions, etc.

These results are in contrast to backward decay functions: prior work has shown approximation algorithms for sum and count with 1+$\epsilon$ relative error for any backward decay function, but requiring a blow up in space by a factor of $O(1/\epsilon \log n)$. See, e.g., M. Datar, A. Gionis, P. Indyk, and R. Motwani, *Maintaining Stream Statistics Over Sliding Windows* (Proceedings of 13th Annual ACM-SIAM Symposium on Discrete Algorithms (SODA), 2002).

In addition to aggregates, forward time decay may be employed to find, for example, the tuple having the smallest (Min) or largest (Max) associated decayed value. Under backward decay functions, this is a challenging task, since the changing value of the decay function over time causes the value of the Min (Max) to vary over time. In contrast, a forward time decay approach produces the following definition for the decayed minimum (MIN):

$$\text{MIN} = \min(g(t_i - L)v_i/g(t - L)) \quad \{\text{Equation 8}\}$$

$$= \frac{1}{g(t-L)} \min_i g(t_i - L)v_i$$

and the following definition for decayed maximum (MAX):

$$\text{MAX} = \max(g(t_i - L)v_i/g(t - L)) \quad \{\text{Equation 9}\}$$

$$= \frac{1}{g(t-L)} \max_i g(t_i - L)v_i.$$

Observe that in both cases it suffices to compute the smallest (greatest) value of $g(t_i-L)v_i$ encountered. For MAX, when a new $(t_i, v_i)$ pair is observed, compute the corresponding value of $g(t_i-L)v_i$, and retain the item if it exceeds the largest value seen so far.

Forward decayed algebraic aggregates may be computed within a streaming system as an extension of the undecayed aggregate. In contrast, this computation is provably hard to solve in small space under backward decay.

For holistic aggregates such as heavy hitters and quantiles, finding answers for queries is generally more complicated. However, approximate solutions for such aggregates, using forward time decay, have the same asymptotic costs as their undecayed equivalents whereas solutions based on backward time decay take at least a logarithmic factor more space.

Decayed heavy hitters refer to those items whose decayed count is at least a $\phi$ fraction of the total decayed count. Efficiently computing the heavy hitters over a stream of arrivals is a challenging problem that has attracted much study even in the unweighted, undecayed case. The difficulty comes from trying to keep track of sufficient information while using fewer resources than explicitly tracking information about each distinct item would require. Efficient approximate solutions, however, are known. Given a parameter $\epsilon$, these approximate solutions may give an error in the estimated decayed count of each item of at most $\epsilon$ times the sum of all decayed counts. Decayed heavy hitter determination can be treated as an instance of a weighted heavy hitters problem, where the weight of each item is set on arrival since the forward time decay based weights do not change over time.

The quantiles of a distribution generalize the median, so that the $\phi$ quantile is that item which dominates a $\phi$ fraction of the other items. As with heavy hitters, a natural weighted generalization can be used over time-decayed weights. Exact computation of quantiles can be costly over large data sets, since it requires keeping information about the whole input. Instead, approximate quantiles tolerate additive error in the rank (relative to the maximum rank). Moreover, forward time based approaches apply to other holistic aggregate computations over data streams including, e.g., clustering and other geometric properties.

It may also be useful to generate generic summaries of large data, on which ad-hoc analysis can be performed after the data has been observed. The canonical example of such a summary is the uniform random sample: given a large enough sample, many aggregates can be accurately estimated by evaluating them on the sample. Various techniques for sampling from data with weights determined by forward decay functions are disclosed.

In a sampling with replacement technique, the goal is to draw samples from the population so that in each drawing, the probability of picking a particular item is the same. For the unweighted case, a single sample is found by the procedure of independently retaining the $i^{th}$ item in the stream (and replacing the current sampled item) with probability 1/i. Under forward decay, the probability of sampling item i should be given as indicated in Equation 10.

$$\frac{w(i,t)}{\sum_{i=1}^{n} w(i,t)} = \frac{g(t_i - L)}{\sum_{i=1}^{n} g(t_i - L)} \quad \{\text{Equation 10}\}$$

A sample with replacement can be drawn under forward decay in constant space, and constant time per tuple. This assertion may be demonstrated by a generalization of an unweighted version that suffices to draw a sample according to this definition. Let $$W_i = \sum_{j=1}^{i} g(t_j - L)$$

denote the sum of the weights observed so far in the stream, up to and including item i. The $i^{th}$ item is retained as the sampled item with probability $g(t_i-L)/W_i$. The probability that the $i^{th}$ item is chosen as the final sample is given by Equation 11.

$$\frac{g(t_i - L)}{W_i} \prod_{j=i+1}^{n} \left(1 - \frac{g(t_j - L)}{W_j}\right) = \frac{g(t_i - L)}{W_i} \prod_{j=i+1}^{n} \frac{W_{j-1}}{W_j} \quad \{\text{Equation 11}\}$$
$$= \frac{g(t_i - L)}{W_n}$$

For a sample of size s, this procedure is repeated s times in parallel with different random choices in each repetition. As in Reservoir Sampling, the procedure can be accelerated by using an appropriate random distribution to determine the total weight of subsequent items to skip over.

A disadvantage of sampling weighted items with replacement is that an item with heavy weight can be picked multiple times within the sampled set, which reveals less about the input. This is a particular problem when applying exponential decay, when the weights of a few most recent items can dwarf all others. Two approaches that work naturally for forward decay are outlined here. Both are based on the observation that, since sampling should be invariant to the global scaling of weights, one can work directly with $g(t_i-L)$ as the weight of the $i^{th}$ item.

Weighted Reservoir Sampling. In weighted reservoir sampling (WRS), a fixed sized sample (reservoir) is maintained online over a stream. A sample of size k without replacement may be drawn, with same probability distribution as the following procedure: At each step i, $1 \leq i \leq k$, select an element from those that were unselected at previous steps. The probability of selecting each element at step i is equal to the element's weight divided by the total weights of items not selected before step i.

Some algorithms generate a "key" $p_i = u_i^{1/w_i}$ for the $i^{th}$ tuple, where $w_i$ is the weight and $u_i$ is drawn randomly from [0 . . . 1]. The sample is the set of k items with the k largest key values. Since $g(t-L)$ can be factored out in forward decay without affecting the sampling probability for each element, the weight of each tuple $w_i = g(t_i-L)$ can be set, and a sample according to the weights in the forward decay model can be obtained.

Priority Sampling. Priority sampling may also include the generation of a sample of size k, with a similar procedure. The priority $q_i$ is defined as $w_i/u_i$ (where $u_i$ is again uniform from [0 . . . 1]), and the algorithm retains the k items with highest priorities. Such a sample can be used to give an unbiased estimator for any selection query. The variance of this estimator is proved to be near-optimal. For similar reasons, priority sampling can also be used over the streams with any decay function within the forward decay model.

Thus, one can maintain a weight based reservoir of stream elements under the WRS or priority sampling models for any decay functions in the forward decay model using space O(k) and time O(log k) to process each element. The time bounds follow by keeping the keys/priorities in a priority queue of size k. It is submitted that drawing such samples over a stream for general backward decay functions without blowing up the space to considerably greater than k is difficult if possible at all.

The special case of drawing a sample under exponential decay has been posed previously, and a partial solution given for the case when the time stamps are sequential integers. See, e.g., C. C. Aggarwal, *On Biased Reservoir Sampling in the Presence of Stream Evolution* (Proceedings of the 32nd International Conference on Very Large Data Bases (VLDB), 2006). By using the forward decay view, a solution for arbitrary arrival times is provided, using space proportional to the desired sample size. One can draw a sample of size k with weights based on exponential decay in the backward decay model using only O(k) space.

Turning now to the drawings, FIG. 1A is a diagram illustrating selected elements of an embodiment of a backward time decay temporal data analysis, referred to herein as backward time decay analysis 100. Backward time decay analysis 100, as shown, is depicted in a plot-format having time X axis 110 and an arbitrary Y axis 112.

X axis 110 may represent the passing of time from an arbitrary origin $t_0$ and is shown demarcated in time units, or intervals, given by $t_0$, $t_1$, $t_2$, $t_3$, $t_4$, $t_5$, $t_6$, $t_7$, $t_8$, $t_9$, and $t_{10}$. Although time units $t_0$ through $t_{10}$ are shown at regular intervals, they may represent any arbitrary or non-uniform time scale, and may indicate any relevant values of time units, such as minutes, seconds, milliseconds, or microseconds, as desired.

Y axis 112 may represent relative values of count for groups of data objects D1, D2, D3, D4, D5, and D6. Y axis 112 may also represent a relative weight scale for decay function 116a, which is also dependent on X axis 110. It is noted that the different scales represented by Y axis 112 in backward time decay analysis 100 may be unrelated to one another.

Populated along X axis 110 are groups of data objects D1, D2, D3, D4, D5, and D6, each representing an aggregate number of data objects arriving at a data management system (not shown in FIG. 1A) over a respective time interval. For example, group D1 may represent a number of data objects arriving over interval $t_0$-$t_1$, group D2 may represent a number of data objects arriving over interval $t_1$-$t_2$, and so on. The height of each group of data objects D1, D2, D3, D4, D5, and D6 may represent the aggregate number, or count, of data objects, which may vary over time, as shown by various group heights in FIG. 1A. Each of the groups of data objects D1, D2, D3, D4, D5, and D6 may so represent a large number of data objects, whose collective mean arrival time roughly corresponds to the center of each displayed group.

Also shown in backward time decay analysis 100 are backward ages 121a, 122a, 123a, 124a, 125a, and 126a, corresponding respectively to groups of data objects D1, D2, D3, D4, D5, and D6. Backward ages 121a, 122a, 123a, 124a, 125a, and 126a are measured relative to current time 114a, representing an arbitrary present time which is constantly incrementing. In backward time decay analysis 100, decay function 116a represents a decreasing weight, or importance, whose values range from a maximum at current time 114a and decrease backwards. Although shown in FIG. 1A as a pseudo-exponential function, it is noted that in various embodiments, decay function 116a may be another function, such as a sliding window function or a polynomial function. For example, a sliding window function may be a binary function with a value of one (1) from current time 114a backwards for a given window width, and then may have a value of zero (0) for all preceding time values.

It is noted that in backward time decay analysis 100, a value of decay function 116a for a particular group (or individual data object within a group not shown in FIG. 1A) may be obtained from the backward age.

Figure 1B:
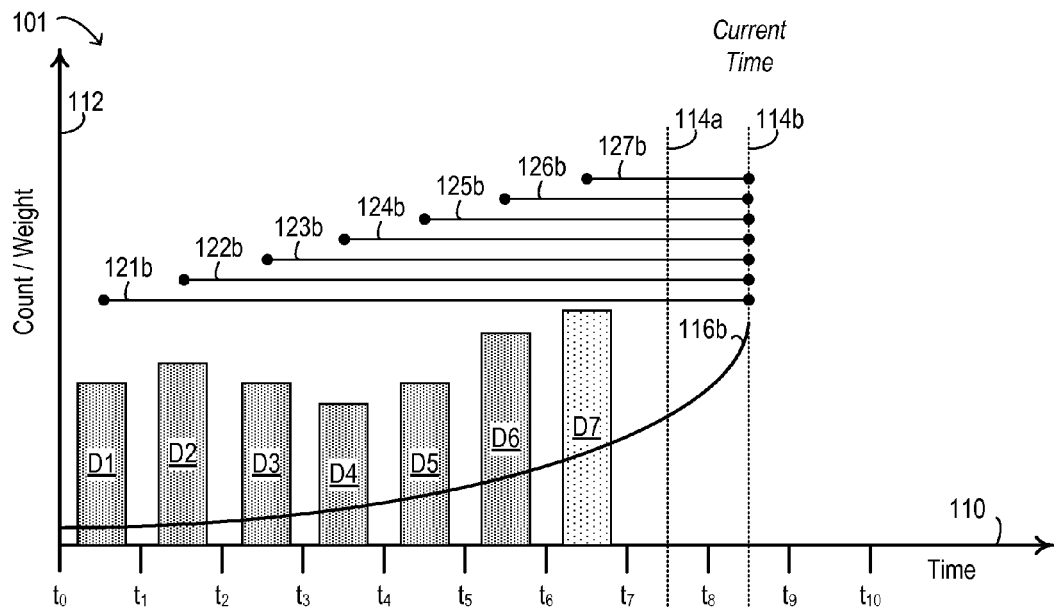

In FIG. 1B, a diagram of selected elements of an embodiment of backward time decay analysis 101 is illustrated. Backward time decay analysis 101 depicts a state of backward time decay analysis 100 at a current time 114b that is later than current time 114a. It is noted that like numbered elements in FIG. 1B represent identical features as described with respect to FIG. 1A.

In FIG. 1B, a new group of data objects D7 has arrived (or been detected), having a mean backward age 127b. However, it is noted that the respective backward ages for groups of data objects D1, D2, D3, D4, D5, and D6 have changed values compared to backward time decay analysis 100. In particular, backward ages 121b, 122b, 123b, 124b, 125b, and 126b are now greater at current time 114b than backward ages 121a, 122a, 123a, 124a, 125a, and 126a at previous time 114a, even though the absolute arrival time for groups of data objects D1, D2, D3, D4, D5, and D6 has not changed. Also in backward time decay analysis 101, decay function 116b has been recalculated based on current time 114b.

Accordingly, determination of a decay value for a given group (or an individual data object not shown in FIGS. 1A, 1B) may be obtained from decay function 116b using the backward age. Thus, in backward time decay 101, obtaining a decay value also involves recalculating (or buffering) new backward ages 121b, 122b, 123b, 124b, 125b, and 126b. Although depicted as mean values for groups of data objects D1, D2, D3, D4, D5, and D6, backward ages may be evaluated for each individual data object, potentially resulting in a large number of calculations as time elapses. Such a multivariate time dependency may represent an inherent computational overhead for backward time decay.

Figure 2A:
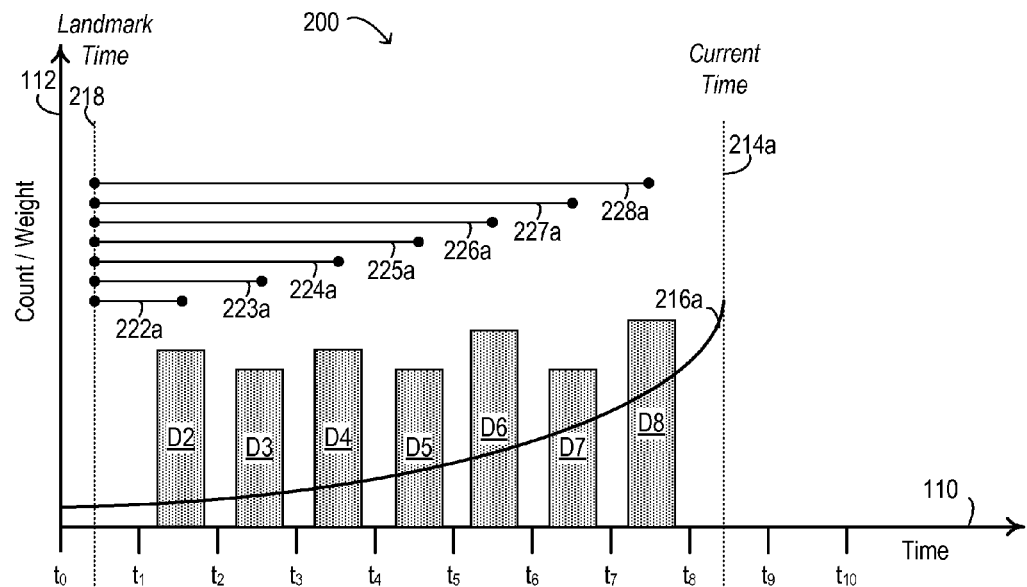
FIGS. 2A and 2B are diagrams illustrating selected elements of an embodiment of a forward time decay temporal data analysis.

Referring now to FIG. 2A, a diagram illustrating selected elements of an embodiment of a forward time decay temporal data analysis is referred to herein as forward time decay analysis 200. It is noted that like numbered elements in FIG. 2A represent identical features as described with respect to FIG. 1A.

In FIG. 2A, groups of data objects D2, D3, D4, D5, D6, D7, and D8 represent a sequence of arriving groups of data objects, as described above with respect to FIG. 1A. Current time 214a represents the present time. Decay function 216a represents a decreasing weight, or importance, whose values range from a maximum at current time 214a and decrease backwards. Decay function 216a may represent a variety of possible decay functions and may be substantially similar to the prior description herein with respect to decay function 116a (see FIG. 1A).

In forward time decay analysis 200, an age associated with a group of data objects (or individual data objects not shown in FIG. 2A) is a forward age measured from landmark time 218. Landmark time 218 is shown in the past relative to groups of data objects D2, D3, D4, D5, D6, D7, and D8. It is noted that landmark time 218 is depicted in forward time decay analysis 200 within the displayed time range for clarity and illustrative purposes. In different embodiments, landmark time 218 may be a different point in the past and, for example, may be much earlier than depicted in FIG. 2A. In forward time decay analysis 200, forward ages 222a, 223a, 224a, 225a, 226a, 227a, and 228a are respective values associated with groups of data objects D2, D3, D4, D5, D6, D7, and D8, measured between an average time for each group and landmark time 218.

Certain differences between forward time decay analysis 200 and backward time decay analyses 100, 101 may be noted. For example, decay function 216a may be determined based on landmark time 218 or current time 214a or both. In certain embodiments, decay function 216a may be determined based on a difference between current time 214a and landmark time 218. Furthermore, in addition to a forward age value, each of the groups of data objects D2, D3, D4, D5, D6, D7, and D8 may be associated with a fraction, or ratio, of the time range between landmark time 218 and current time 214a.

Figure 2B:
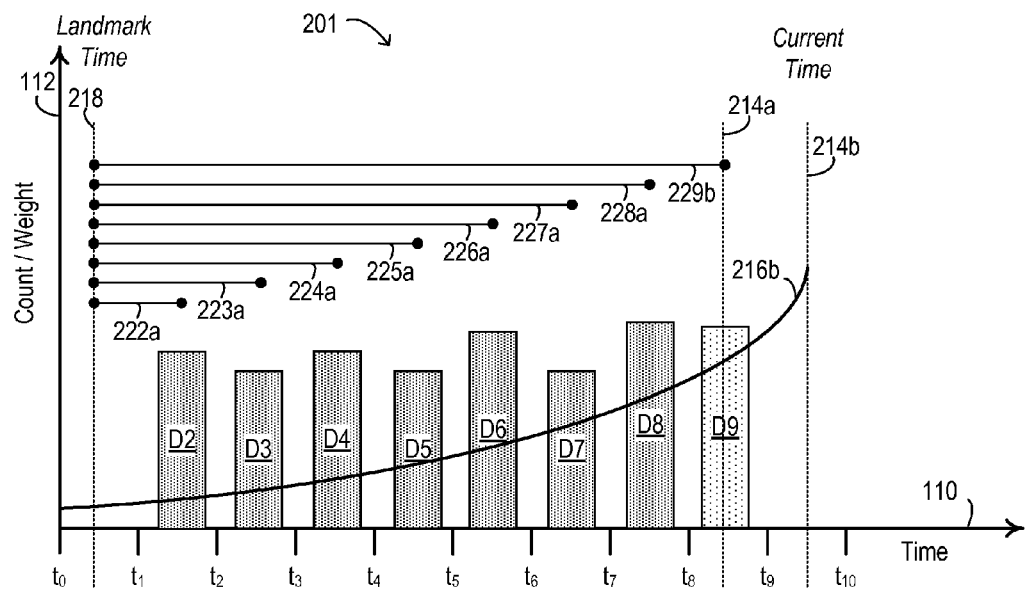

Continuing to FIG. 2B, a diagram of selected elements of an embodiment of forward time decay analysis 201 is illustrated. Forward time decay analysis 201 depicts a state of forward time decay analysis 200 at a current time 214b that is later than current time 214a. Also in forward time decay analysis 201, decay function 216b has been recalculated based on current time 214b. It is noted that like numbered elements in FIG. 2B represent identical features as described with respect to FIG. 2A.

In FIG. 2B, groups of data objects D2, D3, D4, D5, D6, D7, D8, and D9 represent a sequence of arriving groups of data objects. The addition of group D9 at a mean forward age 229b may reflect the arrival of additional data objects as the current time progresses from current time 214a to current time 214b.

In forward time decay analysis 201, forward ages 222a, 223a, 224a, 225a, 226a, 227a, 228a, and 229b are respective values associated with groups of data objects D2, D3, D4, D5, D6, D7, D8, and D9, measured between an average time for each group and landmark time 218. It is noted that forward ages 222a, 223a, 224a, 225a, 226a, 227a, and 228a, remain constant (i.e., do not change) as time elapses. Accordingly, a new iteration of a time decay analysis in forward time decay analysis 201 may involve a determination of forward age 229b and a recalculation of decay function 216b. However, in forward time decay analysis 201, forward ages 222a, 223a, 224a, 225a, 226a, 227a, and 228a for groups of data objects D2, D3, D4, D5, D6, D7, and D8 (or a larger number of forward ages for individual data objects not shown in FIGS. 2A, 2B) may retain their prior values with respect to forward time decay analysis 200 (see FIG. 2A). Such a retention of constant values may significantly reduce the computational overhead for forward time decay analyses 200, 201 as compared to backward time decay analyses 100, 101 (see FIGS. 1A, 1B).

Figure 3:
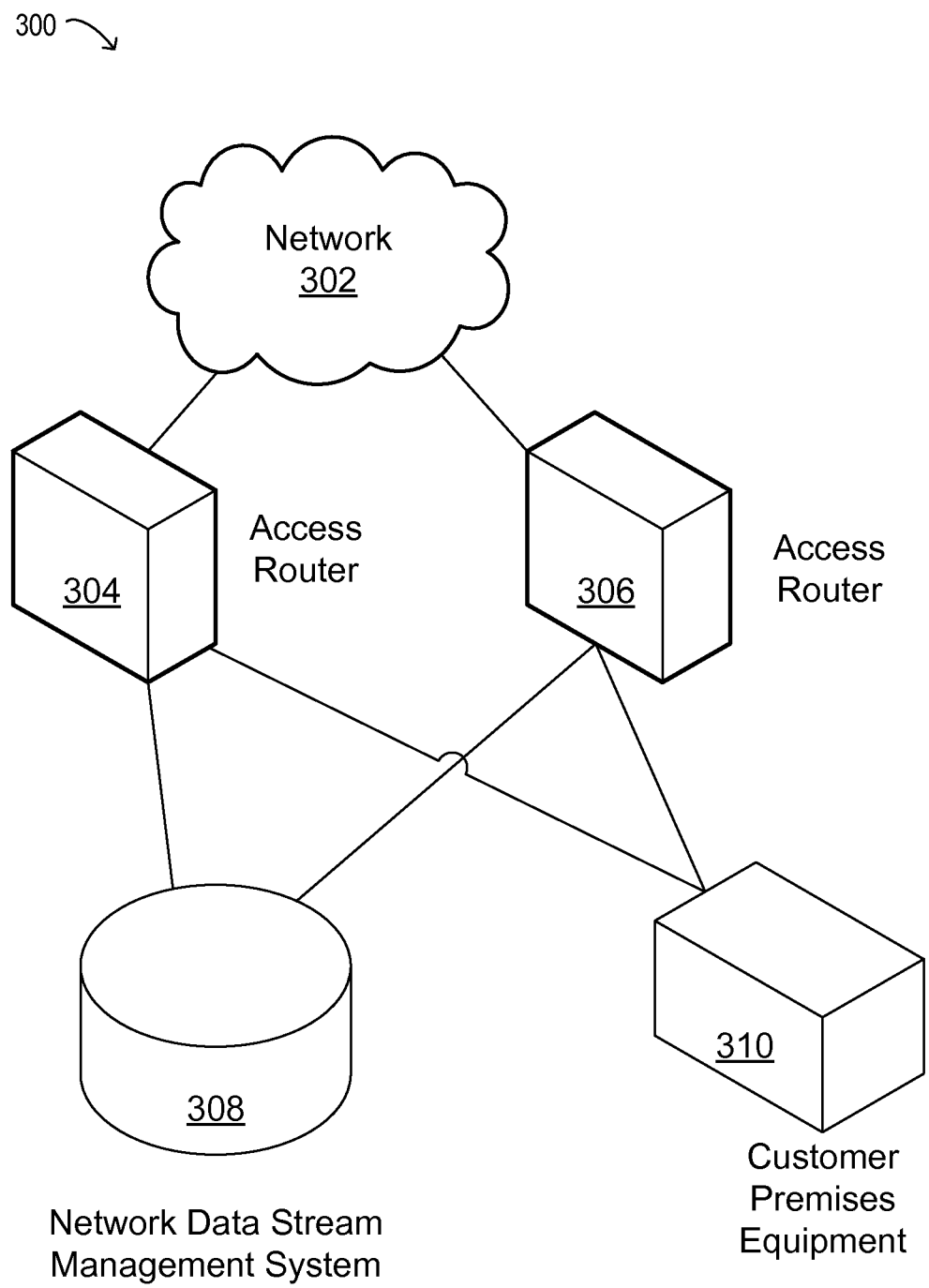
FIG. 3 is a block diagram of selected elements of an embodiment of a temporal data analysis system.

Turning now to FIG. 3, a block diagram of selected elements of an embodiment of temporal data analysis system 300 is illustrated. Temporal data analysis system 300 may implement forward time decay analysis, as described herein, for analyzing network data streams. In particular, temporal data analysis system 300 is an example of a parallel configuration for analyzing data streams.

In temporal data analysis system 300, network 302 may represent a wide-area or a local network that is a fixed or a wireless network, or a combination thereof. Network 302 may be a public network, such as the Internet, or may be a private network. Access routers 304, 306 may represent network infrastructure configured to provide access to and from network 302 to customer premises equipment (CPE) 310. In various embodiments, CPE 310 may represent an enterprise network for serving a plurality of server and client systems (not shown in FIG. 3).

In FIG. 3, network data stream management system 308 may represent a data management system configured to perform time decay analysis, such as forward time decay analysis. Network data stream management system 308 may itself include various components and systems (not shown in FIG. 3), including servers, data storage, network components, and diverse processor-executable instructions (i.e., software modules). In particular embodiments, network data stream management system 308 includes a database system.

In operation, network data stream management system 308 may receive streams of data objects from access routers 304 and 306. Network data stream management system 308 may analyze the received streams using time decay analysis, including forward time decay analysis, and generate reports on network performance. In particular, network data stream management system 308 may be configured to handle extremely large volumes of streamed data with real-time response capability.

Figure 4:
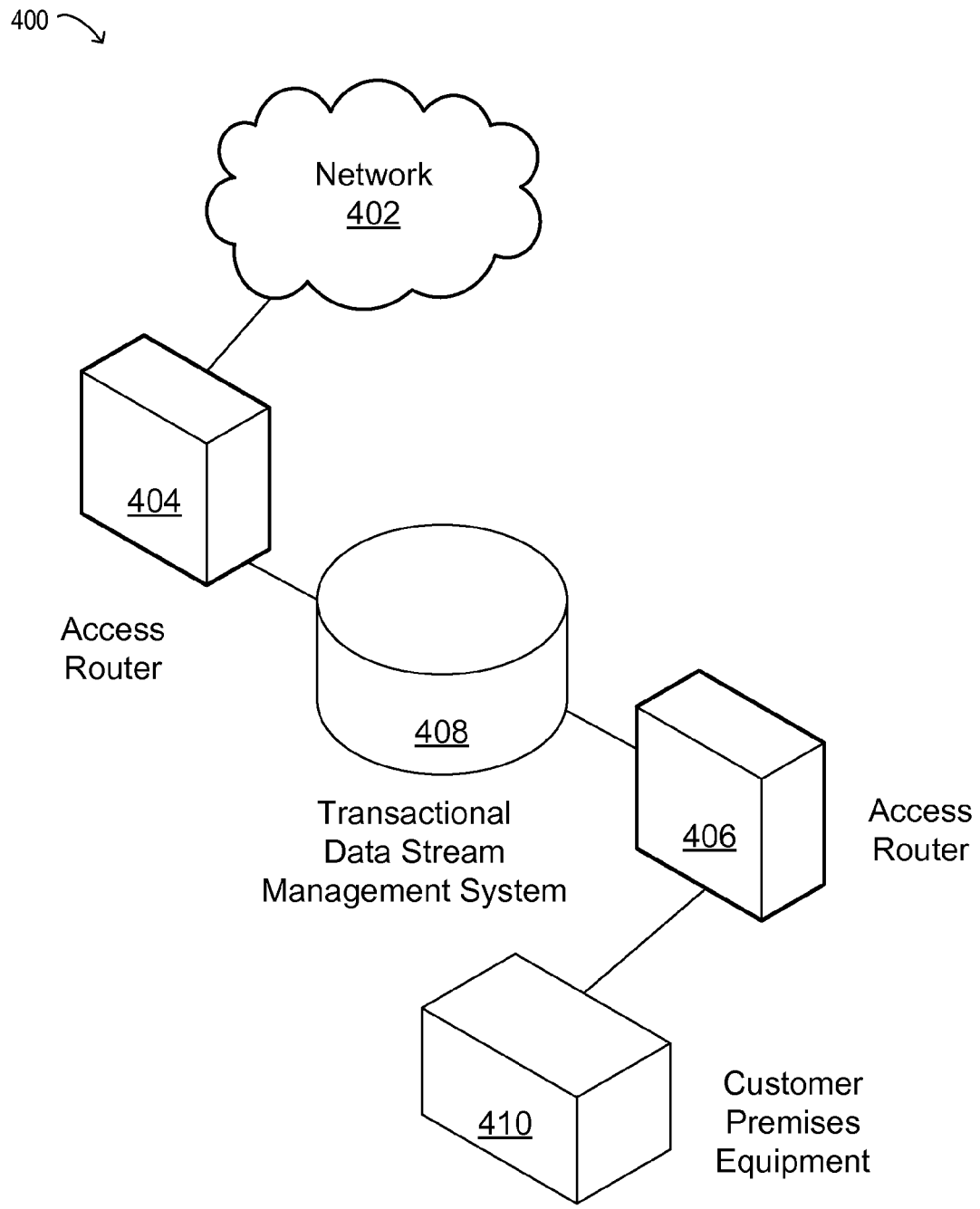
FIG. 4 is a block diagram of selected elements of an embodiment of a temporal data analysis system.

Turning now to FIG. 4, a block diagram of selected elements of an embodiment of temporal data analysis system 400 is illustrated. Temporal data analysis system 400 may implement forward time decay analysis, as described herein, for analyzing network data streams. In particular, temporal data analysis system 400 is an example of a serial configuration for analyzing data streams. In certain embodiments, temporal data analysis system 400 is configured for analyzing transactional data streams, such as purchase transactions or other financial transactions.

In temporal data analysis system 400, network 402 may represent a wide-area or a local network that is a fixed or a wireless network, or a combination thereof. Network 402 may be a public network, such as the Internet, or may be a private network. Access routers 404, 406 may represent network infrastructure configured to provide access to and from network 402 to CPE 410. In various embodiments, CPE 410 may represent an enterprise network for serving a plurality of server and client systems (not shown in FIG. 4).

In FIG. 4, transactional data stream management system 408 may represent a data management system configured to perform time decay analysis, such as forward time decay analysis. Transactional data stream management system 408 may itself include various components and systems (not shown in FIG. 4), including servers, data storage, network components, and diverse processor-executable instructions (i.e., software modules). In particular embodiments, transactional data stream management system 408 includes a database system.

In operation, transactional data stream management system 408 may send/receive streams of data objects to/from access routers 404 and 406. Access router 404 may provide data streams to/from network 402, while access router 406 may provide data streams to/from CPE 410. Transactional data stream management system 408 may analyze the received streams using time decay analysis, including forward time decay analysis. In particular, transactional data stream management system 408 may be configured to handle extremely large volumes of streamed data with real-time response capability.

In particular, transactional data stream management system 408 may arbitrate and/or filter data streams between network 402 and CPE 410, based on the results of time decay analysis, including forward time decay analysis. For example, transactional data stream management system 408 may issue large queries in the form of streamed data, and receive responses to such queries in the form of streamed data, while applying a time decay analysis, including forward time decay analysis, to weight the relative importance of queried data objects. In certain implementations, transactional data stream management system 408 may decide whether to transmit a received data object based on a forward time decay analysis result, such as a forward age or an age factor. In certain embodiments, transactional data stream management system 408 may pass through data streams, while recording and analyzing data streams using time decay analysis, including forward time decay analysis, and generating corresponding reports on network activity.

Figure 5:
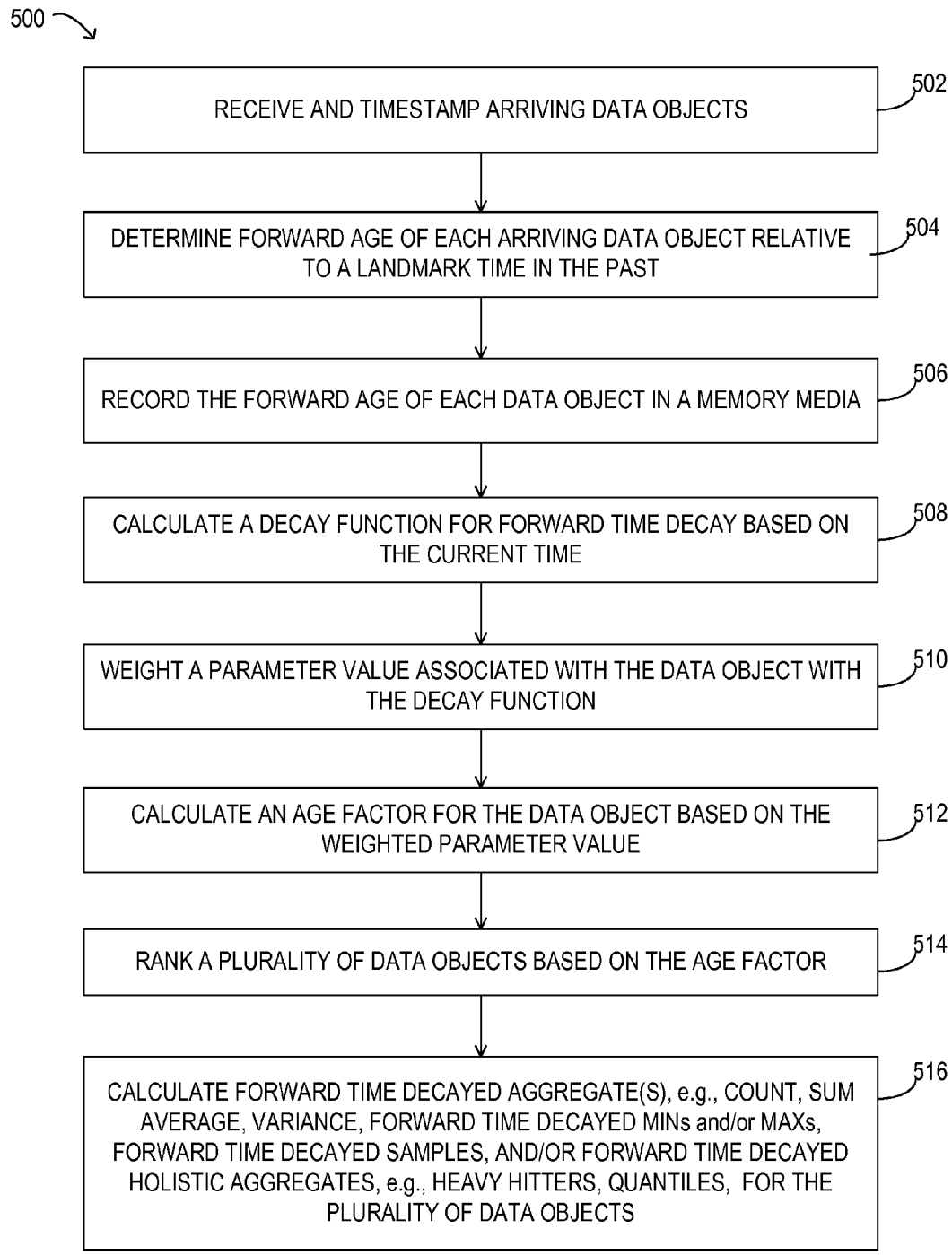
FIG. 5 is a block diagram in flowchart form of selected elements of an embodiment of a temporal data analysis process.

Turning now to FIG. 5, a block diagram of selected elements of an embodiment of a time decay analysis process 500 is depicted. It is noted that process 500 may be implemented by network data stream management system 308 and/or transactional data stream management system 408, in various embodiments. In certain implementations, operations in process 500 may be omitted or rearranged, as desired. Time decay analysis process 500 represents one embodiment of forward time decay analysis.

Arriving data objects may be received and be timestamped (operation 502). A timestamp operation may refer to a determination of an arrival time of a data object, or may refer to receiving a previously determined timestamp associated with a data object. For example, a timestamp associated with a received tuple may indicate the age of the tuple in a database, rather than the time the tuple arrived. The forward age of each arriving data object may be determined relative to a landmark time in the past (operation 504). The forward age may be determined with respect to the timestamp obtained in operation 502. The forward age of each data object may be recorded in a memory media (operation 506). The recording of the forward age may be buffered for rapid access. A decay function for forward time decay may be calculated based on the current time (operation 508). The decay function may be a function parameterized in terms of forward age, i.e., the time that has elapsed from a fixed point in time, namely, the time that has elapsed from the landmark time. A parameter value associated with the data object may be weighted with the decay function (operation 510). The parameter value may be a value provided by the data objects, such as a tuple value. An age factor for the data object based on the weighted parameter value may be calculated (operation 512). In certain embodiments, the age factor may be the weighted parameter value. The age factor may be a value associated with the decay function and/or the forward age. A plurality of data objects may be ranked based on the age factor (operation 514). The ranking may be used to determine a highest and a lowest ranking data object. The weighted parameter values may then be used to calculate (operation 516), for example, forward time decayed aggregate(s), e.g., count, sum, average, variance, forward time decayed MINs and/or MAXs, forward time decayed samples, and/or forward time decayed holistic aggregates, e.g., heavy hitters and quantiles, for the plurality of data objects. The decayed count may be defined as a sum of a decay function value over a plurality of arriving data objects. The decay function value may be determined using the forward age of a data object. The decayed sum may be defined as a sum of a weighted value over a plurality of arriving data objects. The weighted value may be the weighted parameter value associated with a data object. The decayed average may be defined as a ratio of a decayed sum to a decayed count. Other statistical values for the plurality of data objects may also be determined.

Figure 6:
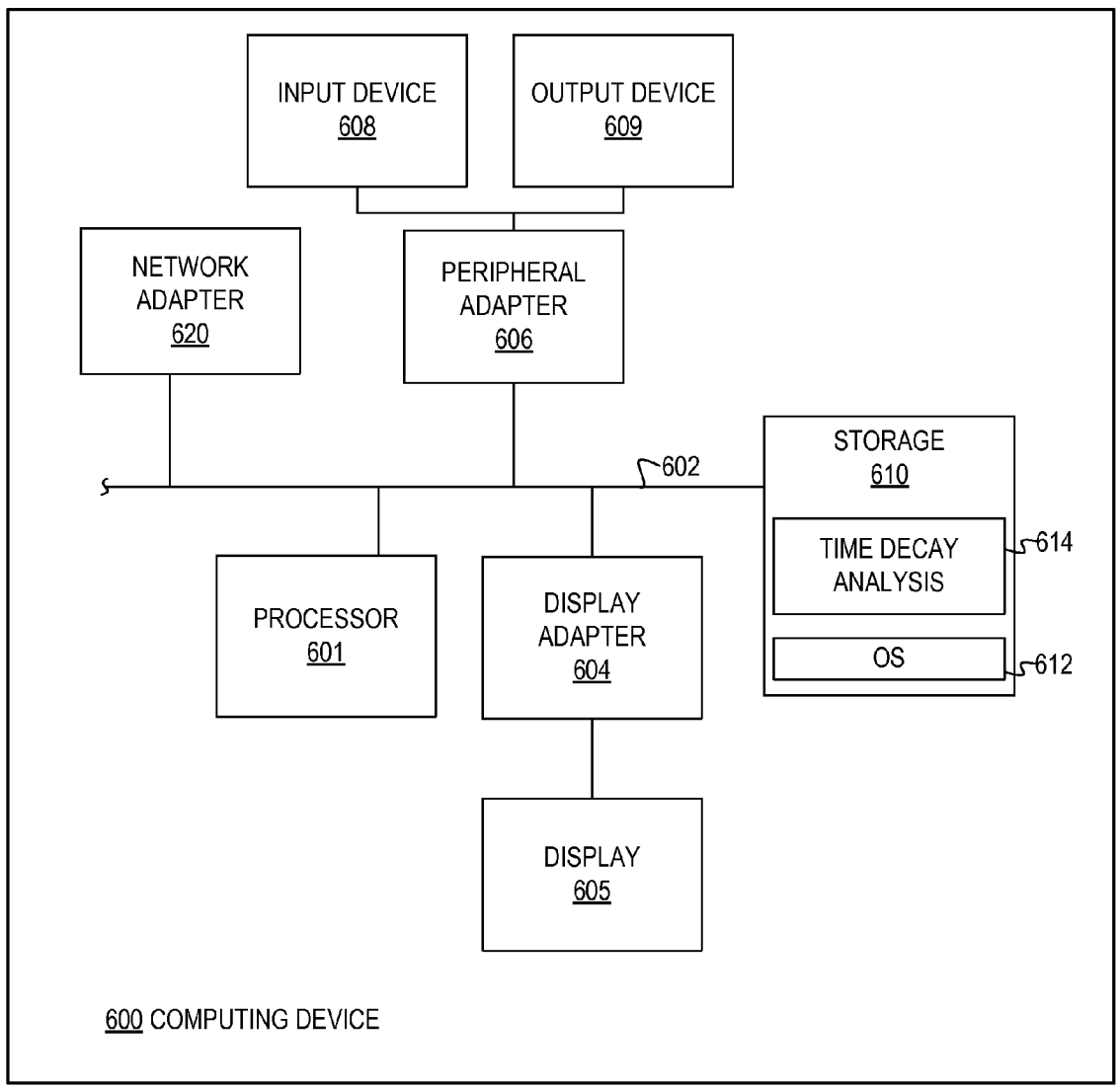
FIG. 6 is a block diagram of selected elements of an embodiment of a computing device.

Referring now to FIG. 6, a block diagram illustrating selected elements of an embodiment of a computing device 600 for performing time decay analysis is presented. It is noted that computing device 600 may represent, at least in part, an embodiment of a data management system, such as network data stream management system 308 (see FIG. 3) or transaction data stream management system 408 (see FIG. 4). In the embodiment depicted in FIG. 6, device 600 includes processor 601 coupled via shared bus 602 to storage media collectively identified as storage 610.

Device 600, as depicted in FIG. 6, further includes network adapter 620 that interfaces device 600 to a network (not shown in FIG. 6). In embodiments suitable for use in document translation or conversion, device 600, as depicted in FIG. 6, may include peripheral adapter 606, which provides connectivity for the use of input device 608 and output device 609. Input device 608 may represent a device for user input, such as a keyboard or a mouse, or even a video camera. Output device 609 may represent a device for providing signals or indications to a user, such as loudspeakers for generating audio signals.

Device 600 is shown in FIG. 6 including display adapter 604 and further includes a display device or, more simply, a display 605. Display adapter 604 may interface shared bus 602, or another bus, with an output port for one or more displays, such as display 605. Display 605 may be implemented as a liquid crystal display screen, a computer monitor, a television or the like. Display 605 may comply with a display standard for the corresponding type of display. Standards for computer monitors include analog standards such as video graphics array (VGA), extended graphics array (XGA), etc., or digital standards such as digital video interface (DVI), high definition multimedia interface (HDMI), among others. A television display may comply with standards such as National Television System Committee (NTSC), Phase Alternating Line (PAL), or another suitable standard. Display 605 may include an output device 609, such as one or more integrated speakers to play audio content, or may include an input device 608, such as a microphone or video camera.

Storage 610 encompasses persistent and volatile media, fixed and removable media, and magnetic and semiconductor media. Storage 610 is operable to store instructions, data, or both. Storage 610 as shown includes sets or sequences of instructions, namely, an operating system 612 and a time decay analysis application 614. Operating system 612 may be a UNIX or UNIX-like operating system, a Windows® family operating system, or another suitable operating system.

As shown in FIG. 6, device 600 is configured to execute instructions for implementing time decay analysis using time decay analysis application 614, for example, in network configuration 300 shown in FIG. 3 and/or network configuration 400 depicted in FIG. 4. In some embodiments, time decay analysis application 614 is also configured to execute process 500 shown in FIG. 5.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method for calculating time decay associated with arriving data objects, the method comprising:
   determining a forward age associated with a data object arriving at a data management system based on a difference between an arrival time of the data object at the data management system and a landmark time prior to the arrival time;
   determining a decay age associated with the data object based on a difference between a current time and the arrival time of the data object;
   recording the forward age in a memory media; and
   calculating a time decay associated with the data object, wherein the calculating a time decay associated with the data object includes:
   and
   weighting a parameter value associated with the data object with a decay function based on the decay age and the forward age, wherein the forward age associated with the data object does not change as time elapses, wherein the decay function is selected from an exponential function, a polynomial function, and a landmark window function;
   calculating an age factor for the data object based on the weighted parameter value;
   ranking a plurality of data objects object based on the age factor to determine a highest and lowest ranking data object; and
   calculating a forward time decayed holistic aggregate based on the weighted parameter values of a plurality of data objects, wherein the forward time decayed holistic aggregate is selected from a forward time decayed heavy hitter and a forward time decayed quantile.

2. The method of claim 1, further comprising calculating a forward time decayed aggregate based on the weighted parameter values of the plurality of data objects, wherein the forward time decayed aggregate is selected from a forward time decayed count, a forward time decayed sum, a forward time decayed average, and a forward time decayed variance.

3. The method of claim 1, further comprising calculating a forward time decayed minimum.

4. The method of claim 1, further comprising drawing a forward time decayed sample without replacement from a population of the plurality of data objects, wherein selection of the forward time decayed sample depends on the weighted parameter values of the population of the plurality of data objects.

5. The method of claim 1, further comprising drawing a forward time decayed sample with replacement from a population of the plurality of data objects, wherein selection of the forward time decayed sample depends on the weighted parameter values of the population of the plurality of data objects.

6. A computer system for calculating time decay associated with arriving data objects comprising:
   a processor; and
   memory storing instructions that, when executed by the processor, perform operations including:
   determining a forward age associated with a data object based on a difference between an arrival time of the data object and a landmark time prior to the arrival time;
   determining a decay age associated with the data object based on a difference between a current time and the arrival time of the data object;
   recording the forward age in the memory;
   calculating a time decay associated with the data object, wherein the calculating the time decay associated with the data object includes:
   weighting a parameter value associated with the data object based on the forward age and on the decay age, wherein the forward age associated with the data object remains a constant, and wherein the decay function is selected from an exponential function, a polynomial function, and a landmark window function;

calculating an age factor for the data object based on the weighting of the parameter value;

ranking a plurality of data objects object based on the age factor to determine a highest ranking data object and a lowest ranking data object; and calculating a forward time decayed holistic aggregate based on the weighted parameter values of the plurality of data objects, wherein the forward time decayed holistic aggregate is selected from a forward time decayed heavy hitter and a forward time decayed quantile.

7. The computer system of claim 6, wherein the decay function value depends on the current time.

8. The computer system of claim 7, wherein the operations further include calculating a decayed count for a plurality of arriving data objects, wherein the decayed count is a sum of the decay function value over the arriving data objects.

9. The computer system of claim 7, wherein the operations further include calculating a decayed sum for a plurality of arriving data objects, wherein the decayed sum is a sum of the weighted value over the arriving data objects.

10. The computer system of claim 7, wherein the operations further include calculating a decayed average for a plurality of arriving data objects, wherein the decayed average is a ratio of a decayed sum to a decayed count, wherein the decayed count is a sum of the decay function value over the arriving data objects, and wherein the decayed sum is a sum of the weighted value over the arriving data objects.

11. The computer system of claim 7, wherein the operations further include:

determining which of the plurality of data objects has a highest weighted value; and determining which of the plurality of data objects has a lowest weighted value.

12. A non-transitory computer readable storage medium including stored program instruction that, when executed by a processor causes a computer to calculate time decay associated with arriving data objects, comprising:

determining a forward age associated with a data object arriving at a data management system based on a difference between an arrival time of the data object at the data management system and a landmark time prior to the arrival time;

determining a decay age associated with the data object based on a difference between a current time and the arrival time of the data object;

recording the forward age in a memory media;

calculating time decay associated with the data object, wherein the calculating of the time decay associated with the data object includes:

weighting a parameter value associated with the data object with a decay function based on the decay age and the forward age, wherein the forward age associated with the data object remains constant as time elapses, wherein the decay function is selected from an exponential function, a polynomial function, and a landmark window function;

calculating an age factor for the data object based on the weighting of the parameter value;

ranking a plurality of data objects based on the age factor to determine a highest ranking data object and a lowest ranking data object; and calculating a forward time decayed holistic aggregate based on the weighted parameter values of the plurality of data objects, wherein the forward time decayed holistic aggregate is selected from a forward time decayed heavy hitter and a forward time decayed quantile.

13. The non-transitory computer readable storage medium of claim 12, wherein the operations include calculating calculate the decay function based on the current time.

* * * * *